United States Patent
Sumizawa et al.

(10) Patent No.: US 7,257,485 B2
(45) Date of Patent: Aug. 14, 2007

(54) NAVIGATION SYSTEM, AND INFORMATION ACQUISITION METHOD

(75) Inventors: Akio Sumizawa, Shindo Sagamihara (JP); Yoshinori Endo, Sumiyoshi Mito (JP); Shinichi Amaya, Nangai Higoshiyamato (JP); Taketo Tsuburaya, Yokoyamadai Sagamihara (JP)

(73) Assignee: Xanavi Informatics Corporation, Zama-shi (JP)

( * ) Notice: Subject to any disclaimer, the term of this patent is extended or adjusted under 35 U.S.C. 154(b) by 0 days.

(21) Appl. No.: 11/594,916

(22) Filed: Nov. 9, 2006

(65) Prior Publication Data

US 2007/0106467 A1     May 10, 2007

(30) Foreign Application Priority Data

Nov. 9, 2005     (JP)     ............................. 2005-324983

(51) Int. Cl.
G01C 21/30     (2006.01)

(52) U.S. Cl. ...................... 701/209; 701/210; 340/988

(58) Field of Classification Search ........ 701/200–213, 701/117; 340/988, 357.01, 357.08, 357.09
See application file for complete search history.

(56) References Cited

U.S. PATENT DOCUMENTS

| | | | |
|---|---|---|---|
| 7,171,306 B2 * | 1/2007 | Hirose | 701/209 |
| 7,177,760 B2 * | 2/2007 | Kudo | 701/209 |
| 7,203,598 B1 * | 4/2007 | Whitsell | 701/210 |

FOREIGN PATENT DOCUMENTS

JP     2001-264088     9/2001

\* cited by examiner

*Primary Examiner*—Richard M. Camby
(74) *Attorney, Agent, or Firm*—Antonelli, Terry, Stout & Kraus, LLP.

(57) ABSTRACT

A technique which enables a navigation system mounted on a vehicle or the like to be connected with an information providing device by utilizing a short range base station.

In cases where a recommended route passes through a communication spot, which is an area enabled for communication by the short range base station, the navigation system is connected with the information providing device through the base station, after moving as far as the communication spot, and in cases where the recommended route does not pass through the communication spot, the system is connected with the information providing device through a public network by a communication terminal.

5 Claims, 13 Drawing Sheets

FIG. 3

| MESH ID | ××××× | |
|---|---|---|
| LINK INFORMATION | LINK ID | ○○○○○○ | 311 |
| | STARTING NODE COORDINATES | (○,○) | 312 |
| | ENDING NODE COORDINATES | (○,○) | 313 |
| | ROAD KIND | TOLL-FREE ROAD | 314 |
| | LINK LENGTH INFORMATION | ○○○○○○ | 315 |
| | REGULATED SPEED INFORMATION | ○○○○○○ | 316 |
| | STARTING CONNECTION LINK | ○○○○ | 317 |
| | ENDING CONNECTION LINK | ○○○○ | 318 |
| | ... | ... |
| LINK INFORMATION | LINK ID | □□□□□□ |
| | STARTING NODE COORDINATES | (□,□) |
| | ENDING NODE COORDINATES | (□,□) |
| | ROAD KIND | TOLL-FREE ROAD |
| | LINK LENGTH INFORMATION | □□□□□□ |
| | REGULATED SPEED INFORMATION | □□□□□□ |
| | STARTING CONNECTION LINK | □□□□ |
| | ENDING CONNECTION LINK | □□□□ |
| | ... | ... |
| LINK INFORMATION | LINK ID | △△△△△△ |
| | STARTING NODE COORDINATES | (△,△) |
| | ENDING NODE COORDINATES | (△,△) |
| | ROAD KIND | TOLL-FREE ROAD |
| | LINK LENGTH INFORMATION | △△△△△△ |
| | REGULATED SPEED INFORMATION | △△△△△△ |
| | STARTING CONNECTION LINK | △△△△ |
| | ENDING CONNECTION LINK | △△△△ |
| | ... | ... |

| COMMUNICATION SPOT POSITION (411) | | DATE/TIME OF UPDATE (412) | ... |
|---|---|---|---|
| ×××××  | (Xa,Ya) | 2005/1/1 0:00 | ... |
| ×××××  | (Xb,Yb) | 2005/1/1 0:00 | ... |
| ... | ... | ... | ... |

| COMMUNICATION SPOT POSITION (511) | | DATE/TIME OF UPDATE (512) | HOME FLAG (513) | REGISTERED FLAG (514) | ... |
|---|---|---|---|---|---|
| ×××××  | (Xc,Yc) | 2005/1/15 12:00 | 1 | 0 | ... |
| ×××××  | (Xd,Yd) | 2005/1/30 15:00 | 0 | 1 | ... |
| ... | ... | ... | ... | ... | ... |

| | |
|---|---|
| MESH ID | |
| LINK ID | ○○○○ |
| TRAVELING TIME | ○○ |
| TRAVELING SPEED | ○○ |
| TIME OF ACQUISITION | 2005/1/10 12:00 |
| ... | ... |
| LINK ID | □□□□ |
| TRAVELING TIME | □□ |
| TRAVELING SPEED | □□ |
| TIME OF ACQUISITION | 2005/1/10 15:00 |
| ... | ... |
| ... | ... |

611 — MESH ID
612 — LINK ID
613 — TRAVELING TIME
614 — TRAVELING SPEED
615 — TIME OF ACQUISITION

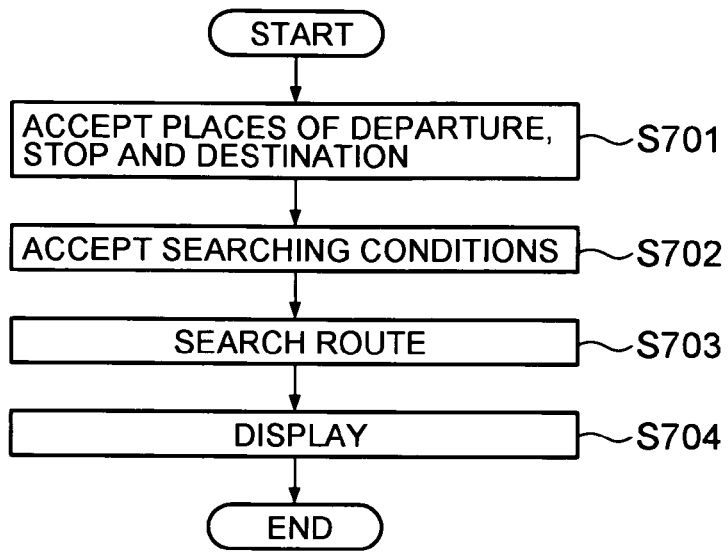
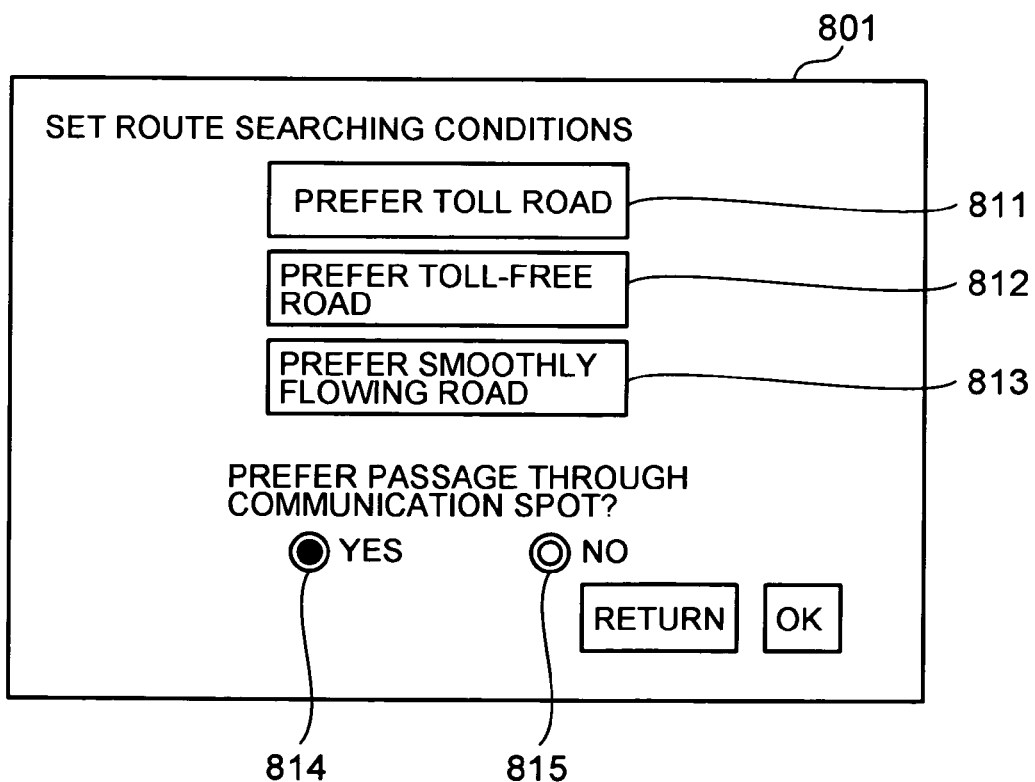

NAVIGATION SYSTEM, AND INFORMATION ACQUISITION METHOD

BACKGROUND OF THE INVENTION

The present invention relates to a navigation system to be mounted on a vehicle or the like.

The vehicle-mounted navigation system has functions to set a destination, to search a route from the current place to the destination by the Dijkstra's algorithm or the like, and to guide the vehicle according to the searched route. The vehicle-mounted navigation system further has a function to be connected with an information providing device such as a server thereby to acquire useful information from that information providing device.

Japanese Patent Laid-Open Publication No. 2001-264088 (hereinafter, referred to as Patent Document 1) discloses a technique in which the information providing device transmits information concerning shops, parking areas or events to the navigation system through public networks, satellites or broadcasts.

In order to acquire the information, as described above, it is necessary to connect the information providing device and the vehicle-mounted navigation system. For this connection between the information providing device and the vehicle-mounted navigation system, enterprises and the like have provided, as services, base stations for short range communication (i.e., DSRC: Dedicated Short Range Communication) such as wireless LAN (Local Area Network), Bluetooth or ETC (Electronic Toll Collection). Usage charges for the base stations provided as services by the enterprises, are mostly free or low. From the viewpoint of communication costs, therefore, it is desired to communicate using the base stations for short range communication.

For communication with a base station within a short range, therefore, the vehicle mounted navigation system has to be so positioned as can communicate with that base station.

However, the vehicle-mounted navigation system is thought to move with the traveling vehicle so that it cannot always be located in an area in which communication with the short range base station is possible.

SUMMARY OF THE INVENTION

The present invention has been conceived in view of these circumstances and has as an object the provision of a technique by which a navigation system mounted on a vehicle or the like can be connected with an information providing device by making use of a base station for short range communication.

The invention has been conceived to achieve the above-specified object. In cases in which a route passes through a communication spot which is an area where communication by a short range base station is possible, a navigation system is connected with the information providing device, through the base station after having moved as far as the communication spot, and in cases where the route does not pass through the communication spot, the navigation system is connected with the information providing device through a public network by a communication terminal.

According to the invention, there is provided a navigation system connected with an information providing device through a public network and various base stations for short range communications, for receiving information transmitted from said information providing device. The navigation system comprises: map information storage means which stores the information indicating a position of said base station and map data containing road data; route storage means which stores a route composed of at least one road; current position calculating means which calculates current position; first communication means connected with said base station; second communication means connected with the public network; and decision means which decides whether or not the route read from the route storing means passes through an area in which communication by the base station read from said map information storage means is possible. In cases in which it is decided that said route passes through the area in which communication is enabled by said base station, said navigation system is connected with said base station by said first communication means after said area is reached, and in cases in which it is decided that said route does not pass through the area in which communication is enabled by said base station, said navigation system is connected with said public network by said second communication means.

According to the technique of the invention, in cases in which the route passes the communication spot or the area which can be connected with the information providing device through the short range base station, the navigation system can be connected through the base station after it has moved to the communication spot, but, in cases in which the route does not pass through the communication spot, can be connected through the public network by using the communication terminal. In this way, when a base station is provided as a service by enterprises and the like, the base station can be used. Furthermore, irrespective of there being a communication spot on a road that is planned to be traveled, there is no longer a need to connect via the public network or to pay communication charges, such as packet charges accompanying the use of the public network, to the communication enterprise.

BRIEF DESCRIPTION OF THE DRAWINGS

FIG. 3 is a diagram explaining one example of map data in the same embodiment;

FIG. 4 is one example of communication spot information in the same embodiment;

FIG. 5 is one example of registered communication spot information in the same embodiment;

FIG. 6 is one example of traffic information in the same embodiment;

FIG. 7 is an example of operations and shows a summary of the navigation system to search for a route in the same embodiment;

FIG. 8 is an example of a screen for setting conditions of a route to be searched in the same embodiment;

DESCRIPTION OF THE PREFERRED EMBODIMENT

In the navigation system of this embodiment, an area in which communication is possible with the base station for short range communication, is stored in a storage device, so that, in cases in which the route searched by a conventional searching operation passes through some area, the navigation system is connected with the information providing device through the base station after it has moved to that area. In cases in which the route searched by the conventional searching operation does not pass through the area in which communication is possible with the base station for the short range communication, the navigation system is connected with the information providing device through the public network. Moreover, the navigation system of this embodiment is connected with the information providing device through the public network, even in cases in which it does not pass through the area in which communication with the base station for short range communication is possible, within a predetermined traveling time or within a predetermined distance range, from the connection between the information providing device the previous time and the current position.

A position at which communication is enabled by the base station for the short range communication will be called the "communication spot".

The following description is made assuming that the information to be acquired from the information providing device is traffic information such as traveling time, traffic regulation information and accident information, but acquired information is not limited thereto. The information may also include the weather forecast, user-preferred shops registered in advance, the starting time or place for an event, or contents such as musical data or image data.

One embodiment of the invention will be described in detail with reference to the accompanying drawings.

Figure 1:
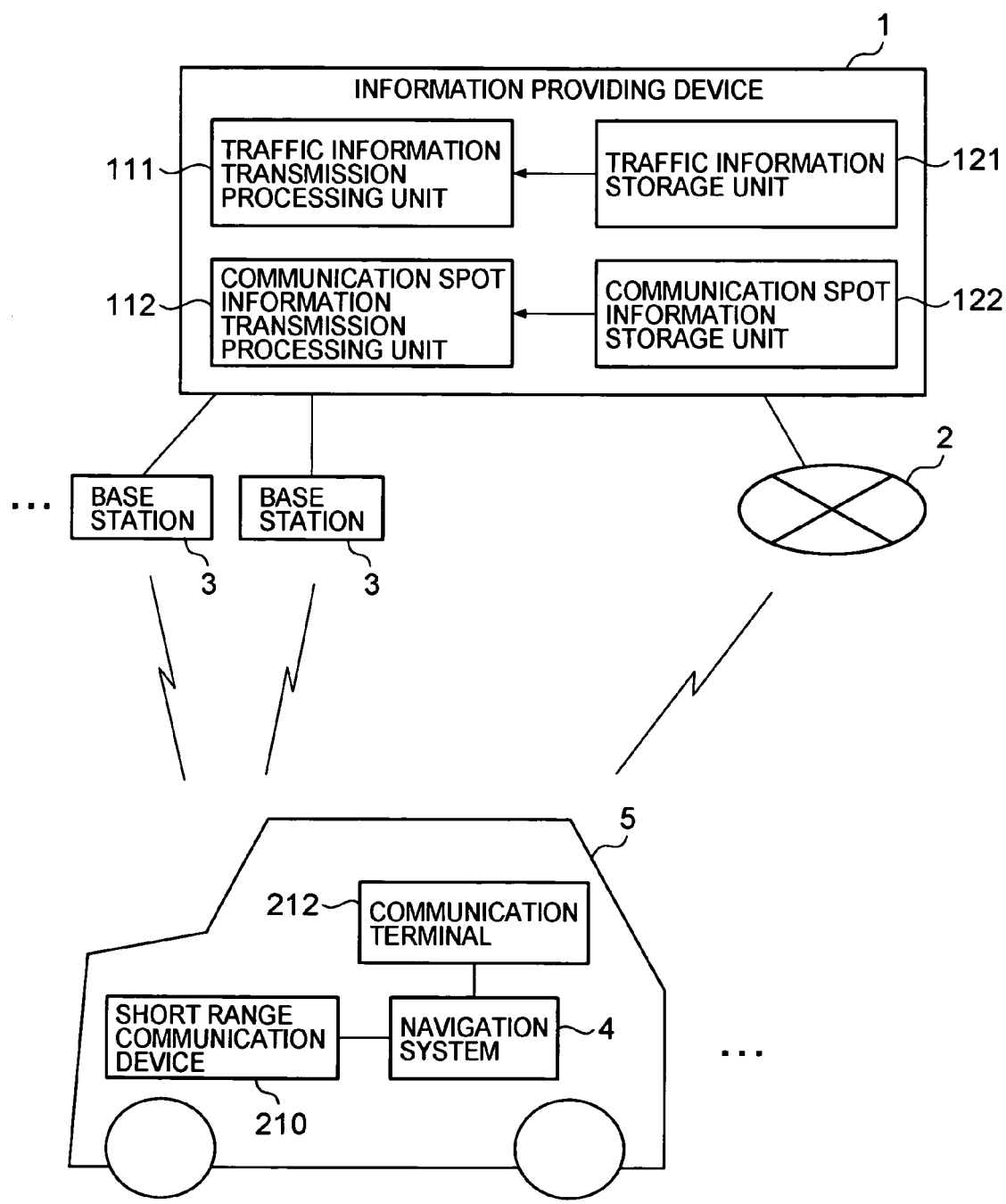
FIG. 1 is a diagram explaining a system configuration example in one embodiment of the invention.

First, one example of a system configuration of the embodiment is described with reference to FIG. 1.

An information acquisition system of this embodiment is configured to include an information providing device 1, a public network 2, a base station 3, a navigation system 4 and the like, mounted on a vehicle 5.

The navigation system 4 mounted on the vehicle 5 is connected with the base station 3 by a short range communication device 210. The navigation system 4 is further connected with the public network 2 through a communication terminal 212.

Here, it is assumed that the information providing device 1 is so disposed by the maker of the vehicle 5 as to provide services of traffic information for the user who has purchased the vehicle 5.

The information providing device 1 is an information processing device such as a server, which is connected individually with the base station 3 and the public network 2 through a communication network such as the Internet or LAN (although both are not shown). The information providing device 1 includes a traffic information transmission processing unit 111, a communication spot information transmission processing unit 112, a traffic information storage unit 121, a communication spot information storage unit 122 and the like. The traffic information transmission processing unit 111 and the communication spot information transmission processing unit 112 are functions which are realized when the (not-shown) arithmetic unit such as a CPU (Central Processing Unit) executes the program loaded from the (not-shown) storage unit such as an HDD (Hard Disk Drive). Moreover, the traffic information storage unit 121 and the communication spot information storage unit 122 are storage units in a memory device (not shown) such as a HDD.

The traffic information storage unit 121 is stores information such as traffic information, i.e., traveling time or traffic regulating information of the later-described link. This traffic information is exemplified by the road traffic information and the like acquired from a VICS (Vehicle Information and Communication System) center, for example, and is assumed to have been inputted to and stored in the information providing device 1 through an input device (not shown) or the like. The communication spot information storage unit 122 stores information indicating the position of the base station 3 of the short range communications, i.e., information indicating the position of the communication spot. The information indicating the position of the communication spot is the mesh ID or coordinate information and the like of the base station 3 in the later-described map data. This information is assumed to have been inputted to and stored in the information providing device 1 through the input device (not shown) or the like.

The traffic information transmission processing unit 111 transmits the traffic information or the like read from the traffic information storage unit 121, to the navigation system 4. The communication spot information transmission processing unit 112 transmits the information read out from the communication spot information storage unit 122 and indicating the position of the communication spot, to the navigation system 4.

The public network 2 is a mobile telephone network, for example. The public network 2 is connected with the information providing device 1 through a dedicated line, the Internet (although not shown) or the like.

The base station 3 is a facility for short range communications such as to an AP (Access Point) of the wireless LAN, a device having the functions of Bluetooth, a car-mounted antenna of the ETC, or the device (a road-side device) capable of communicating with the car-mounted antenna of the ETC. The base station 3 is connected with the information providing device 1 through the dedicated line, the Internet line (not shown) or the like. Here, it is assumed that the base station 3 is provided as the services of an enterprise or the like or as the wireless LAN base station of the user's home.

In this embodiment, it is assumed that the base station, as provided as services by the enterprise, is disposed at a sales shop (or dealer) of the vehicle 5. The user is registered in advance so that the user may communicate through the base station 3 disposed in the dealer.

The navigation system 4 is mounted on the vehicle 5. The navigation system 4 has functions of route searching, current position calculating, route guiding and the like possessed by a conventional navigation system. In addition, the navigation system 4 is stored in its storage unit with the map information containing information indicating the positions of the communication spots. With this information indicating the positions, the navigation system 4 decides whether or not the route will pass through a communication spot. In cases in which the route passes through the communication spot, the navigation system 4 moves to that communication spot, and is then connected with the information providing device 1 through the base station 3 by the short range communication device 210, so that it receives the traffic information. In cases in which the route does not pass through the communication spot, on the other hand, the navigation system 4 is connected through the public network 2 by the communication terminal 212 so that it receives the traffic information. Moreover, the navigation system 4 receives the information transmitted from the information providing device 1 and indicating the position of the base station 3, and stores it in the storage device. The navigation system 4 stores in the storage device the position designated by the user as the position of the new base station 3. The navigation system 4 registers, in cases in which it detects a new communication spot while traveling along the road, information indicating the position of that communication spot.

Figure 2:
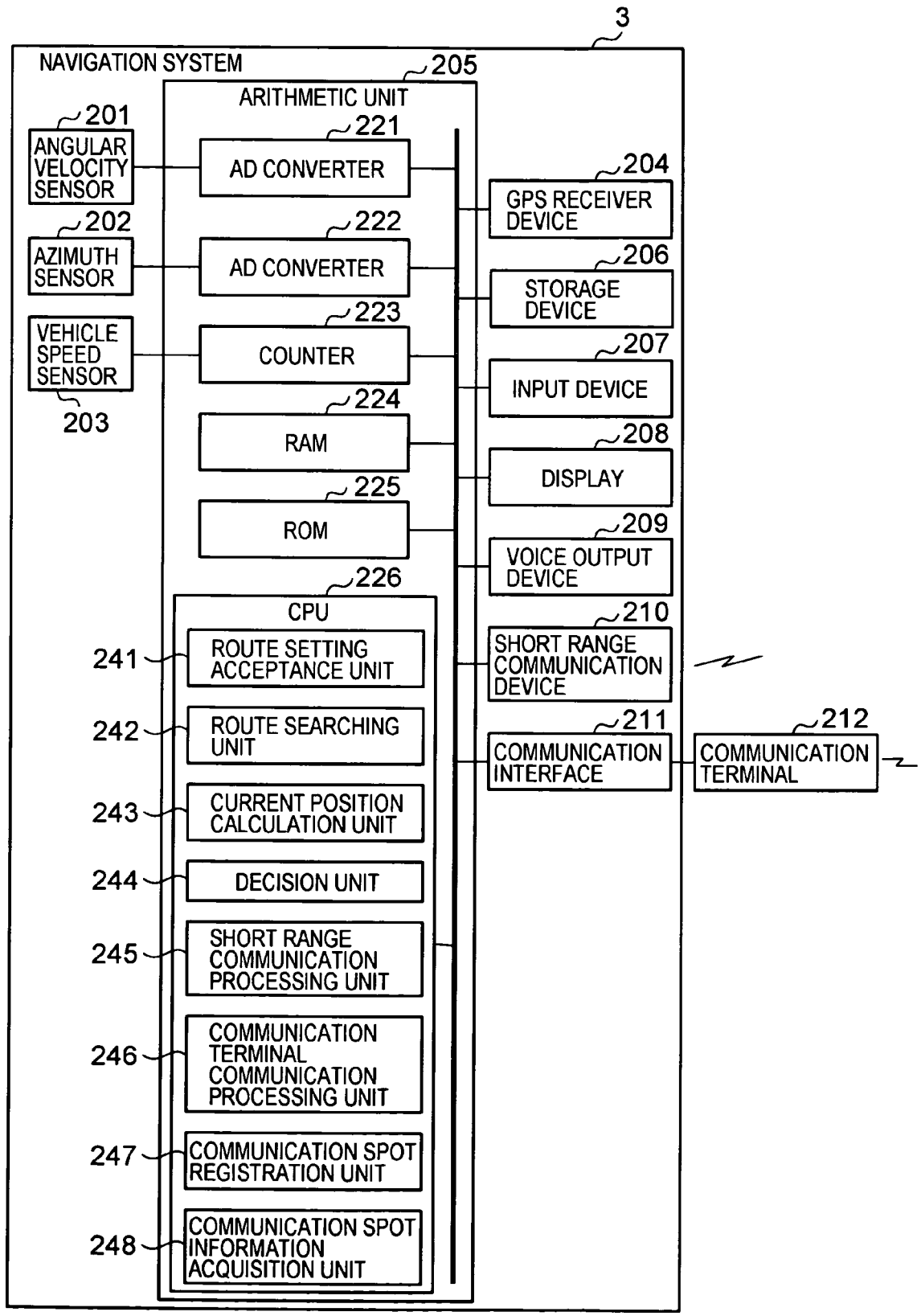
FIG. 2 is a diagram showing an example of the configuration of a navigation system in the same embodiment.

Described here is an example of the configuration of the navigation system 4 with reference to FIG. 2. In FIG. 2, the navigation system 4 includes an angular velocity sensor 201, an azimuth sensor 202, a vehicle speed sensor 203, a GPS (Global Positioning System) receiver device 204, an arithmetic unit 205, a storage device 206, an input device 207, a display 208, a voice output device 209, the short range communication device 210, a communication interface 211, the communication terminal 212 and the like.

The angular velocity sensor 201 detects the yaw rate of the vehicle thereby to detect the change in the azimuth of the vehicle 5. The azimuth sensor 202 detects the terrestrial magnetic field thereby to detect the azimuth of the vehicle 5. The vehicle speed sensor 203 counts the pulses, as outputted at a time interval proportional to the rotations of the output shaft of the transmission of the vehicle, thereby to calculate the vehicle speed.

The GPS receiver device 204 receives the signals from the GPS satellites and measures the distances between the vehicle 5 and the GPS satellites and the changing rates of the distances thereby to measure the position, the running azimuth, the running velocity and so on of the vehicle 5.

The storage device 206 is a storage media such as a CD-R (Compact Disc-Recordable) or a DVD-RAM (Digital Versatile Disk-Random Access Memory), a drive device for the storage media, or a HDD for storing the communication spot information indicating the map data or the position of the communication spot.

The input device 207 is exemplified by a remote control, a remote-controlled receiver unit, a touch panel, a switch and the like.

The display 208 displays a map and composes and displays the current position, the route and so on on the displayed map. The voice output device 209 is exemplified by a speaker for outputting a voice or the like for guidance.

The short range communication device 210 is provided for communicating with the base station 3, and is exemplified by a device which can be connected with an AP of the wireless LAN, a device having functions of Bluetooth, a car-mounted antenna for ETC, and the like. The communication interface 211 is an interface for connections with the communication terminal 212. The short range communication device 210 is set for communications with the base station 3 disposed at a dealer's location, the base station 3, a home wireless LAN, or the like.

The communication terminal 212 is exemplified by a mobile telephone or a communication device connected with the public network 2.

The arithmetic unit 205 controls the operations of individual peripheral devices thus far described, and includes an AD converter 221, an AD converter 222, a counter 223, a RAM 224, a ROM 225, a CPU 226 and the like.

The AD converter 221 converts the (analog) signal of the angular velocity sensor 201 into a digital signal. The AD converter 222 converts the (analog) signal of the azimuth sensor 202 into a digital signal. The counter 223 counts the pulse number outputted from the vehicle speed sensor 203, at an interval of 0.1 secs, for example. The RAM 224 stores the traffic information received, operation data by the CPU 226, data read from the storage device 206, and so on. The ROM 225 stores programs, data, and so on.

The CPU 226 is enabled by executing the programs of the ROM 225 to realize a route setting acceptance unit 241, a route searching unit 242, a current position calculation unit 243, a decision unit 244, a short range communication processing unit 245, a communication terminal communication processing unit 246, a communication spot registration unit 247, a communication spot information acquisition unit 248 and so on. The route setting acceptance unit 241 accepts the routing conditions for searching for a destination, a route thereto, or the like. The route searching unit 242 performs the route searching operations from the searching conditions such as the destination or route thereto, the current position and the map data, to acquire the route to be taken. The current position calculation unit 243 calculates the current position of the vehicle 5. These route searching operations of the route searching unit 242 and the current position calculating operations of the current position calculation unit 243 are identical to those of the conventional art.

The decision unit 244 decides whether or not the communication spot is on the later-described recommended route. The short range communication processing unit 245 is connected with the information providing device 1 through the base station 3 thereby to acquire the traffic information. The communication terminal communication processing unit 246 is connected by using the communication terminal 212 with the information providing device 1 through the public network 2 thereby to acquire the traffic information. These communication operations by the short range communication processing unit 245 through the base station 3 and by the communication terminal communication processing unit 246 through the public network 2 are identical to those of the conventional art.

In cases in which it discovers an unregistered communication spot in the storage unit 206 while the vehicle 5 is traveling, the communication spot registration unit 247 registers that communication spot. The communication spot information acquisition unit 248 accepts the information on the communication spot transmitted from the information providing device 1, and stores that information in the storage unit 206.

The map data, the communication spot information and so on, which are stored in the storage device 206, are described here.

The map data is described first. In this embodiment, the map data is assumed to contain a plurality of meshes uniquely determined by latitudes and longitudes, and the X-Y coordinates for plotting positions in the individual meshes. These individual meshes are indicated by mesh IDs. The map data contains the mesh IDs, and image data, road data, address data and place name data of a plurality of maps, which contain the X-Y coordinates for those mesh IDs. The position on the map data is uniquely indicated by the mesh IDs and the X-Y coordinates.

The road data is approximated by at least one segment joining two points, and this segment is expressed by the X-Y coordinates of its starting point and ending point. This segment will be called the "link", the two ends of which are called the "nodes".

FIG. 3 is one example of the map data stored in the storage device 206. In FIG. 3, the map data contains a plurality of map information tables 301. Each map information table 301 contains one mesh ID 302, at least one piece of link information 303 and so on. The mesh ID 302, the link information 303 and the like are made to correspond to each other. The mesh ID 302 is an identification code of the mesh. The link information 303 is concerned with each of the links configuring the roads which are contained in the mesh of the corresponding mesh ID 302.

The link information 303 contains a link ID 311, starting node coordinates 312, ending node coordinates 313, a road kind 314, link length information 315, regulation speed information 316, a starting connection link 317, an ending connection link 318 and so on. The link ID 311, starting node coordinates 312, ending node coordinates 313, road kind 314, link length information 315, regulation speed information 316, starting connection link 317, ending connection link 318 and so on are made to correspond to each other. The link ID 311 is an identification code of the link. The starting node coordinates 312 and the ending node coordinates 313 are the X-Y coordinates of two nodes (i.e., the starting node and the ending node) configuring the link of the corresponding link ID 311. The road kind 314 is the kind of the road containing the link of the corresponding link ID 311. The link length information 315 indicates the length of the link of the corresponding link ID 311. The regulation speed information 316 indicates the regulation speed (or the limit speed) of the link of the corresponding link ID 311. The starting connection link 317 and the ending connection link 318 are link IDs of the links individually connecting the two nodes of the links of the corresponding link ID 311. Here, the upward and downward directions of a road are managed as different links by distinguishing the starting node and the ending node for the two nodes configuring the link. Although not shown, moreover, the map information table 301 contains image information or the like of the map, and information (e.g., the address, the telephone number, the name and the X-Y coordinates) of the map components, outside of the road, contained in the mesh indicated by the mesh ID 302.

It is assumed that the map data, as exemplified in FIG. 3, is stored in advance in the storage device 206 of the navigation system 4.

One example of the communication spot information is described here. The communication spot information of this embodiment is the POI (Point of Interest) information of the position of the base station 3.

In this embodiment, the communication spot information is obtained from the enterprise or the like providing the base station 3 and the other registered by the user or the navigation system 4. The communication spot information, as obtained from the enterprise or the like providing the base station 3, is exemplified by the information or the like indicating either the communication spot which is stored in advance in the storage device 206 at the time of purchasing the navigation system 4, or the communication spot which is transmitted from the information providing device 1 by the later-described operations. The communication spot information registered by the user of the navigation system 4 is exemplified by the information indicating the position of the communication spot which is newly discovered while the vehicle 5 is traveling or the communication spot which is registered by the user. For distinguishing purposes, the communication spot information registered by the user or the navigation system 4 will be called the "registered communication spot information".

FIG. 4 presents one example of the communication spot information, which is provided by the enterprise providing the base station 3 and stored in the storage device 206. In FIG. 4, a communication spot information table 401 contains the communication spot position 411, the date/time of update 412 and so on. The communication spot position 411, the update date/time 412 and so on are made to correspond to each other. The communication spot position 411 is the information indicating the position where the communication spot exists, and is assumed in this embodiment to contain the aforementioned mesh ID in the map data and the X-Y coordinates in that mesh ID. The update date/time 412 indicates the date/time, at which the corresponding communication spot information 411 was stored and the like.

The communication spot information table 401 is assumed to have been stored in advance in the storage device 206, but may also be updated by receiving the information transmitted from the information providing device 1 by later-described operations.

FIG. 5 presents one example of the registered communication spot information to be registered by the user or the navigation system 4. In FIG. 5, a registered communication spot information table 501 contains a communication spot position 511, a date/time of update 512, a home flag 513, a registered flag 514 and so on. The communication spot position 511, date/time of update 512, home flag 513 and registered flag 514 are made to correspond to each other. The communication spot position 511 is the information indicating the position where the communication spot exists, and is assumed in this embodiment to contain the mesh ID in the aforementioned map data and the X-Y coordinates in the mesh ID. The update date/time 512 is the date and time at which the corresponding communication spot information 511 is stored. The home flag 513 is a flag indicating whether or not the base station 3 of the corresponding communication spot position 511 is the home wireless LAN base station. In the example of FIG. 5, a case in which the home flag 513 is at "1" indicates that the base station 3 of the corresponding communication spot position 511 is the home wireless LAN. The registered flag 514 is the flag indicating whether or not the base station 3 of the corresponding communication spot position 511 is newly discovered and registered while the vehicle 5 is running. In the example of FIG. 5, in cases in which the registered flag 514 is at "1", it is indicated that the base station 3 of the corresponding communication spot position 511 is newly discovered and registered while the vehicle 5 is traveling.

Described here is one example of the traffic information, which is received by the navigation system 4, transmitted from the information providing device 1 and stored in the RAM 224.

FIG. 6 presents one example of the traffic information. In FIG. 6, a traffic information table 601 includes a mesh ID 611, a link ID 612, a traveling time 613, a traveling speed 614, a time of acquisition 615 and so on. The mesh ID 611, link ID 612, a traveling time 613, traveling speed 614 and acquisition time 615 are made to correspond to each other. The mesh ID 611 is the identifying data indicating the aforementioned mesh of the map data. The link ID 612, the traveling time 613, and the traveling speed 614, the acquisition time 615 and the like corresponding to the mesh ID 611, are traffic information of the road contained in that mesh. In this embodiment, it is assumed that one traffic information table 601 stores the traffic information of one mesh, and that a plurality of traffic information tables 601 are contained in cases of traffic information of a plurality of meshes.

The link ID 612 is the link ID or the road identifying data. The traveling time 613 is the time period which is required to pass through the link of the corresponding link ID 612. The traveling speed 614 is the speed which is required to pass through the link of the corresponding link ID 612. The acquisition time 615 is the date and time at which the corresponding traveling time 613, traveling speed 614 and the like are acquired. Herein the traffic information table 601, both the traveling time 613, the traveling speed 614 and the like are not essential, but either of them is sufficient.

The traffic information, as exemplified in FIG. 6, is assumed to have been transmitted from the information providing device 1 and to be stored in the RAM 224. The traffic information may also be acquired from the FM multiplex broadcast receiver device or beacon receiver device, although not shown.

Described here is an example of the operation.

First, an example of the route searching operation is described.

The route searching operation is schematically described with reference to FIG. 7. This operation is started by accepting the route searching request or the like from the user through the input device 207. Here, the operation described with reference to FIG. 7 is identical to that of the navigation system of the conventional art, excepting that the passage of the communication spot can be set as the route searching condition.

In FIG. 7, the route setting acceptance unit 241 accepts (at S701) places of departure, stop and destination. Specifically, the route setting acceptance unit 241 sets the current location, which is outputted from the current position calculation unit 243 when the route searching request is accepted, as the place of departure. The route setting acceptance unit 241 sets the locations passed through, and the destination in accordance with the inputted instruction of the user. For example, the route setting acceptance unit 241 displays the map image of a component in the display 208, so that the mesh ID and the X-Y coordinates of the locations passed through and the destination are acquired according to the information inputted by the user using the input device 207.

Next, the route setting acceptance unit 241 accepts (at S702) the input of the route searching condition on what condition the route is searched in the route search. Specifically, the route setting acceptance unit 241 displays the searching condition setting screen in the display 208 with the image data read and the like from the ROM 225 or the like. An example of the screen is shown in FIG. 8. In FIG. 8, a screen 801 contains buttons 811 to 813, radio buttons 814 and 815, and so on. The button 811 sets the mode in which the route is searched, preferring the toll road. The button 812 sets the mode in which the route is searched, preferring a toll-free road. The button 813 sets the mode, in which the route is searched preferring a smoothly flowing road. The radio buttons 814 and 815 set whether or not the passage of the communication spot is preferred in each of those modes. The navigation system 4 of this embodiment is different from the navigation system of the conventional art in that it can set whether or not the passage of the communication spot is preferred.

When the user indicates a setting by pushing any button with the input device 207 and then an "OK" button, the route setting acceptance unit 241 instructs the route searching unit 242 to search the route in the mode set by pushing the button. The route searching unit 242 performs the route search under the set condition.

Next, the route searching unit 242 performs the route search (at S703). One example of the operation of S703 is described in detail with reference to FIG. 9. Here, an example of the operation to be described with reference to FIG. 9 is identical to that of the navigation system of the conventional art, excepting the operation example in which the link to pass through the communication spot is preferentially selected, in cases where the passage of the communication spot is preferentially set with the aforementioned searching condition.

Figure 9:
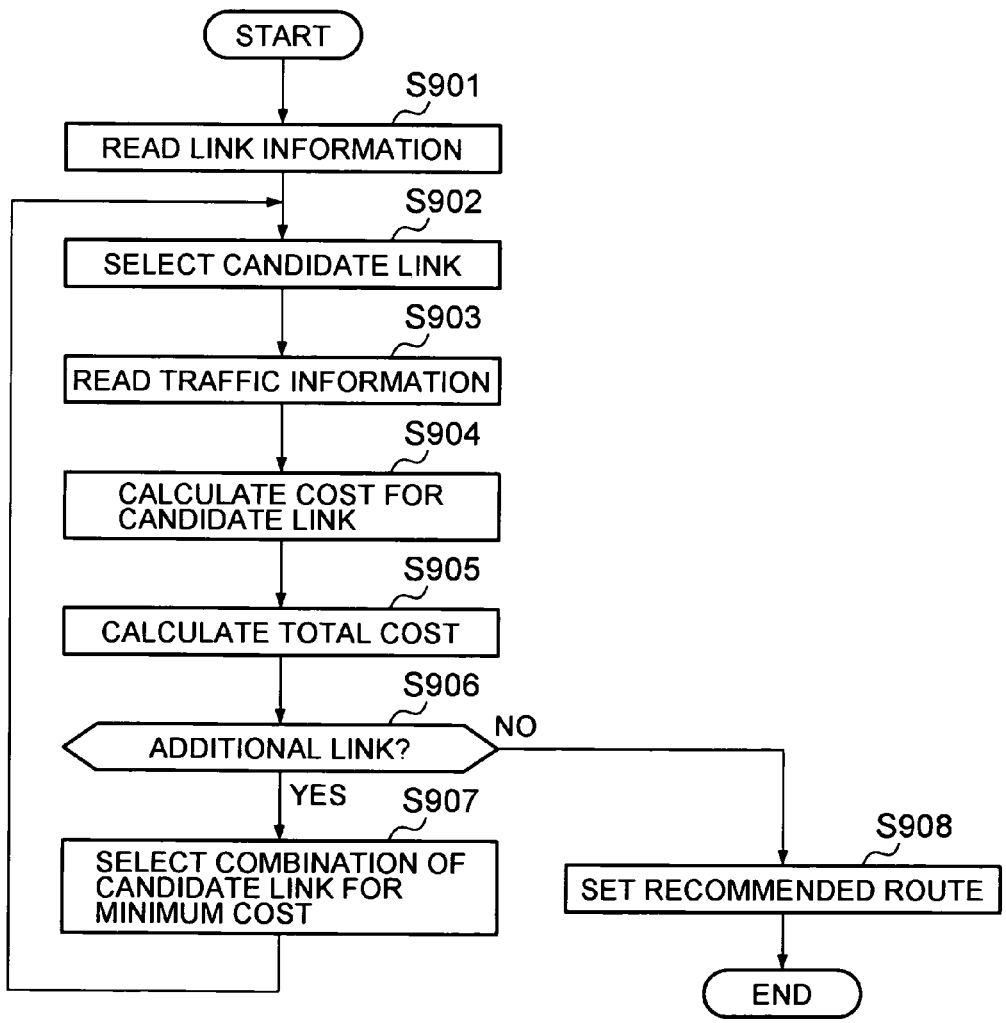
FIG. 9 is an example of operations for searching for the route in the same embodiment.

In FIG. 9, the route searching unit 242 reads (at S901) the link information of the link which is contained in each mesh containing the area containing the locations of departure and destination, from the mesh ID and the X-Y coordinates of the current position. For this, the route searching unit 242 specifies first the mesh ID of the mesh containing the mesh ID and X-Y coordinates of the current position, the mesh ID and the X-Y coordinates of the departure, and the mesh ID and the X-Y coordinates of the destination. Each map information table 301 containing the specified mesh ID 302 is read from the storage device 206, and each piece of stored link information 303 is read from the map information table 301.

Next, the route searching unit 242 selects (at S902) the candidate link for the route link, from the read link information 303. Specifically, the route searching unit 242 stores, in the table such as the RAM 224, the link ID of each link composing the route and the total cost of the costs for the links composing that route. This table will be called the "heap table". The route searching unit 242 extracts the link at the end portion opposed to the departure, from the links composing the route stored in the heap table, and selects such a link for the candidate link having the ending node of the extracted link of the link information 303 read by the aforementioned operations, as the starting node coordinates 312. There may be one or more candidate links, selected here. At the initial state where no link is registered in the heap table, however, the route searching unit 242 selects not the link having the ending node of the extracted link as the starting node coordinates 312 but at least one link at or near the departure, as the candidate link.

Next, the route searching unit 242 reads (at S903) the traffic information from the RAM 224. Specifically, for example, the route searching unit 242 reads a traffic information table 601 from the RAM 224 containing the link ID 612 identical to the link ID of the candidate link selected at S902. This traffic information may be either transmitted from the information providing device 1 by the later-described operation or one acquired from the not-shown FM multiplex broadcast receiver device or the beacon receiver device and stored in the RAM 224.

Next, the route searching unit 242 calculates (at S904) the cost of each candidate link with the traffic information in the RAM 224. Here, the method for calculating the cost for the candidate link is arbitrary. Described here is one example of the method for determining the cost of the candidate link of the case, in which the mode of searching the route while preferring the smoothly flowing road is selected in the screen 801 exemplified in FIG. 8.

Described here is an example of a case in which the link having a large quotient for the traveling speed divided by the regulation speed is preferentially selected to search the route preferring the smoothly flowing road and in which the traveling time is considered. The route searching unit 242 determines the value, which is calculated by multiplying the traveling time by an inverse of the quotient of the traveling speed divided by the regulation speed, as the cost for the candidate link, as expressed by the following formula:

$$\text{Cost}=(\text{Traveling Time})\times(\text{Regulation Speed}/\text{Traveling Speed})\times k$$

Here, the traveling speed is determined, for example, from the traveling time 613 contained in the traffic information table 601. Specifically, the traveling speed is calculated from the map information table 301 by dividing the link length 315 of the candidate link by the traveling time 613. However, the traveling speed 614 is used as it is, in cases in which it is contained in the traffic information table 601. In cases in which neither the traveling speed nor the traveling time are contained, on the other hand, the cost cannot be directly determined, but may be compensated for by assigning the cost for the peripheral link.

The letter "k" designates a coefficient. This coefficient "k" may be changed depending upon whether the candidate link passes through the communication spot, in cases in which it is set at the aforementioned searching condition setting of S702 and passage through the communication spot is preferred. For example, the cost calculated using the coefficient "k" for cases in which the candidate link does not pass through the communication spot, may be higher than the cost calculated using the coefficient "k" for cases in which the candidate link passes through the communication spot. In cases in which passage through the communication spot is not set as being preferred, the coefficient "k" may be set to the same value whether or not the candidate link passes through the communication spot. In order to decide whether or not the candidate link passes through the communication spot, the route searching unit 242 decides whether either the communication spot position 411 or the communication spot position 511, contained in the communication spot information table 401 or the registered communication spot information table 501, is positioned on the passage of that candidate link. Here, this decision is identical to the technique of the POI of the conventional art.

If the cost is determined by the aforementioned numerical formula, what is searched is a route composed of links in which traveling can be done at speeds closer to the regulation speed, and which have a shorter travel time.

In FIG. 9, the route searching unit 242 calculates (S905) the total cost of the candidate link from the departure to the end node. Specifically, the route searching unit 242 adds the costs, as calculated at S904, of the individual candidate links, to the total cost stored in the heap table, and adopts the result of additions as a new total cost. For initial processing time when no route is registered in the heap table, however, the route searching unit 242 adopts the cost, as calculated at S904, of the candidate link as the total cost. The route searching unit 242 adds the individual link IDs of the candidate links and the total cost to the heap table.

Next, the route searching unit 242 decides (at S906) whether or not the link to reach the destination is among the candidate links newly added to the heap table in the processing of S905.

In cases in which S906 decides that no link reaches the destination, the route searching unit 242 selects (at S907) the route with minimum total cost from the heap table. Specifically, the route searching unit 242 sorts the information registered in the heap table, in order of lower total cost, and selects the initial route. Next, the route searching unit 242 repeats the processing of S902.

In cases in which S906 decides that the link reaches the destination, the route searching unit 242 decides (at S908) the route. Specifically, the route searching unit 242 sets the combination containing the links to reach the destination, as the route from the heap table, and stores the link ID of the links composing that passage and the nodes of the link in the RAM 224. In the following, the route, which is stored in the RAM 224 and guided by the route decision processing of S908, will be called the "recommended route".

By the operations thus far exemplified, the route searching unit 242 can search for the route which satisfies the searching conditions set in the searching condition setting step S702.

Here, the route searching operations to be applied to this embodiment are not restricted to the aforementioned one, and another route searching method can also be adopted. For example, there may also be adopted a route searching method, in which all routes contained in the assumed meshes and extending from the departure to the destination are examined in a round-robin manner by Dijkstra's algorithm, so that the lowest cost route is searched for, among all routes. In this case, too, for each route, according to the set searching condition, the cost of the links configuring each route is determined by the numerical formula, as exemplified above, and with the sum thereof as the total cost of the routes, the route can be searched for.

Returning to FIG. 7, the description is. In FIG. 7, the route searching unit 242 displays (at S704) over a map image the recommended route and the communication spot obtained by the operations thus far described. Specifically, the route searching unit 242: superposes the recommended route over the image data of the map data read from the storage device 206, reads the communication spot position 411 and the communication spot position 511 from the communication spot information table 401 and the registered communication spot information table 501 of the storage device 206, and synthesizes and displays an icon indicating the communication spot, at the positions corresponding to the mesh ID read on the image data of the map and at positions corresponding to the X-Y coordinates. The image data of the icon indicating the communication spot is stored in advance in the storage device 206 or the like. The icon indicating the communication spot may be different depending upon whether it is positioned at the communication spot position 411 read from the communication spot information table 401 or at the communication spot position 511 read from the registered communication spot information table 501. Moreover, the icon of the communication spot may be the communication spot position 511 read from the registered communication spot information table 501, or may be different depending upon the "0" and "1" of the home flag 513 corresponding to the communication spot position 511 or the "0" and "1" of the registered flag 514 corresponding to the communication spot position 511.

Here, the route searching unit 242 need not display all the communication spots contained in the map data, but may display, for example, only the communication spots positioned within a predetermined range from the recommended route.

Figure 10:
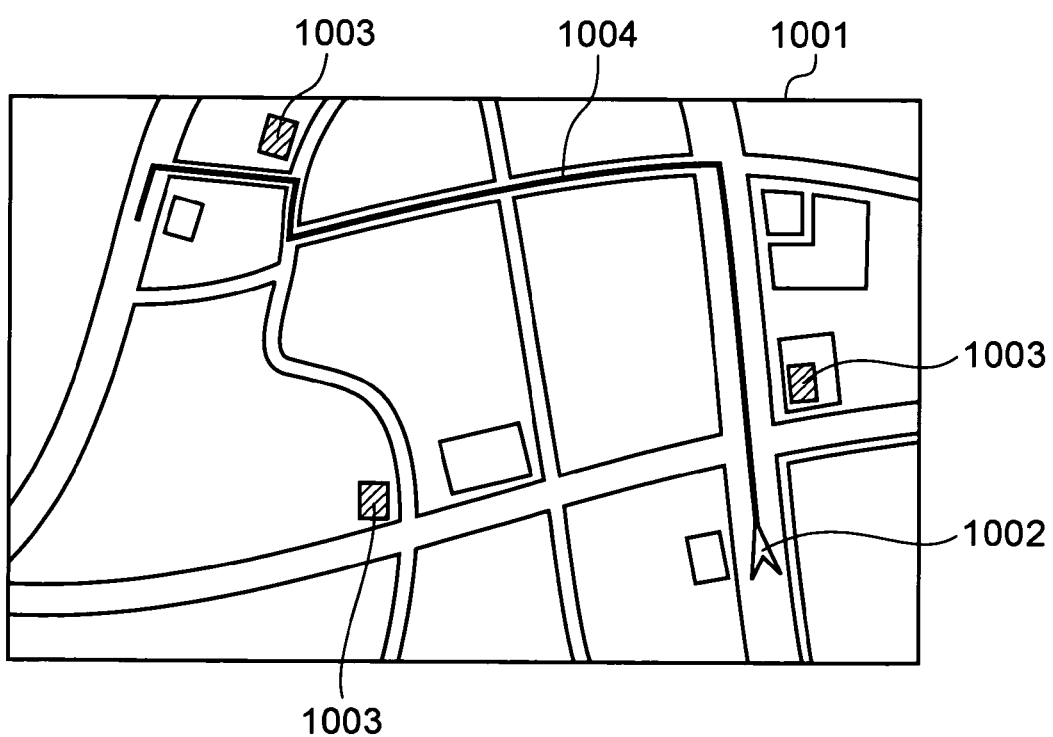
FIG. 10 is an example of a screen for displaying the route, communication spots and current position in the same embodiment.

FIG. 10 shows a screen example displaying the recommended route, the communication spots and so on. In FIG. 10, a screen 1001 is an example in which the image data of a map is synthesized with a current position 1002, communication spots 1003 and a route 1004. The current position 1002 is indicated by an arrow in FIG. 10. Moreover, the communication spots 1003 are hatched. The route 1004 is indicated by thick lines.

Described here is an example of an operation to calculate the current position. The current position calculating operation to be described is different from the conventional art in the following. A judgment is made as to whether or not a communication spot is on the recommended route; if yes, the traffic information is downloaded when the communication spot is reached, and if no, the traffic information is downloaded using the communication terminal 212.

Figure 11:
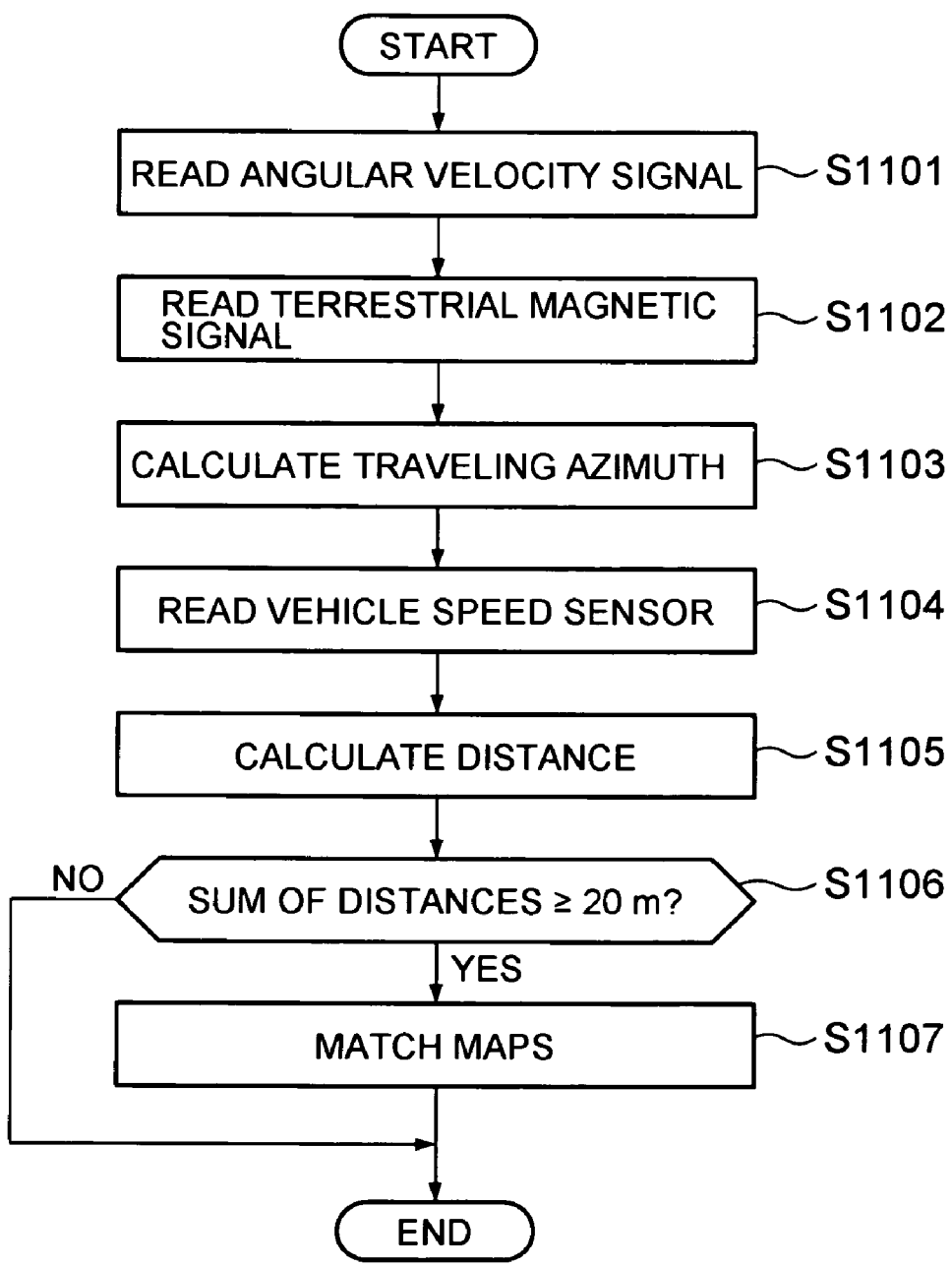
FIG. 11 is an example of operations and shows an outline in which the navigation system calculates the current position in the same embodiment.

The operations shown in FIG. 11 are executed once every fixed period, e.g., every 100 milliseconds, by the current position calculation unit 243.

First, the current position calculation unit 243 reads (at S1101) the output value of the angular velocity sensor 201 from the AD converter 221. Next, the current position calculation unit 243 reads (at S1102) the output value of the azimuth sensor 202 from the AD converter 222, and calculates (at S1103) the traveling azimuth of the vehicle from the output value of the angular velocity sensor 201 and the output value of the azimuth sensor 202. Here, this calculation of the traveling azimuth may use only the output value of the azimuth sensor 202, because the output value of the angular velocity sensor 201 has a large error when the vehicle speed is low for at least a predetermined time.

The current position calculation unit 243 counts the output pulse number of the vehicle speed sensor 203 once every predetermined time period, such as 0.1 seconds, with the counter 223, and reads (at S1104) the counted value. The current position calculation unit 243 calculates (at S1105) the distance traveled for a predetermined time period of 0.1 seconds, by multiplying the read value by a distance coefficient.

The current position calculation unit 243 stores the RAM 224 sequentially with the traveling azimuths and distances thus acquired for every predetermined time period.

Next, the current position calculation unit 243 decides (at S1106), by adding the distance value calculated at S1105 and traveled by the vehicle 5 within the predetermined time period to the distance value up to the preceding time, whether or not the added distance is equal to or exceeds a predetermined distance (e.g., 20 m).

In cases in which the decision of S1106 indicates that the predetermined distance has not been reached, the current position calculation unit 243 ends processing for this time, and repeats the aforementioned processing after a predetermined period.

In cases in which the decision of S1106 indicates that the predetermined distance or greater has been reached, the current position calculation unit 243 stores in the RAM 224 the traveling direction and distance at that time, and executes (S1107) the map match operations, as will be described hereinafter. Here, the distance to be stored in the RAM 224 by the current position calculation unit 243 is the predetermined distance, such as 20 m, as used in the aforementioned decision of S1106.

Figure 12:
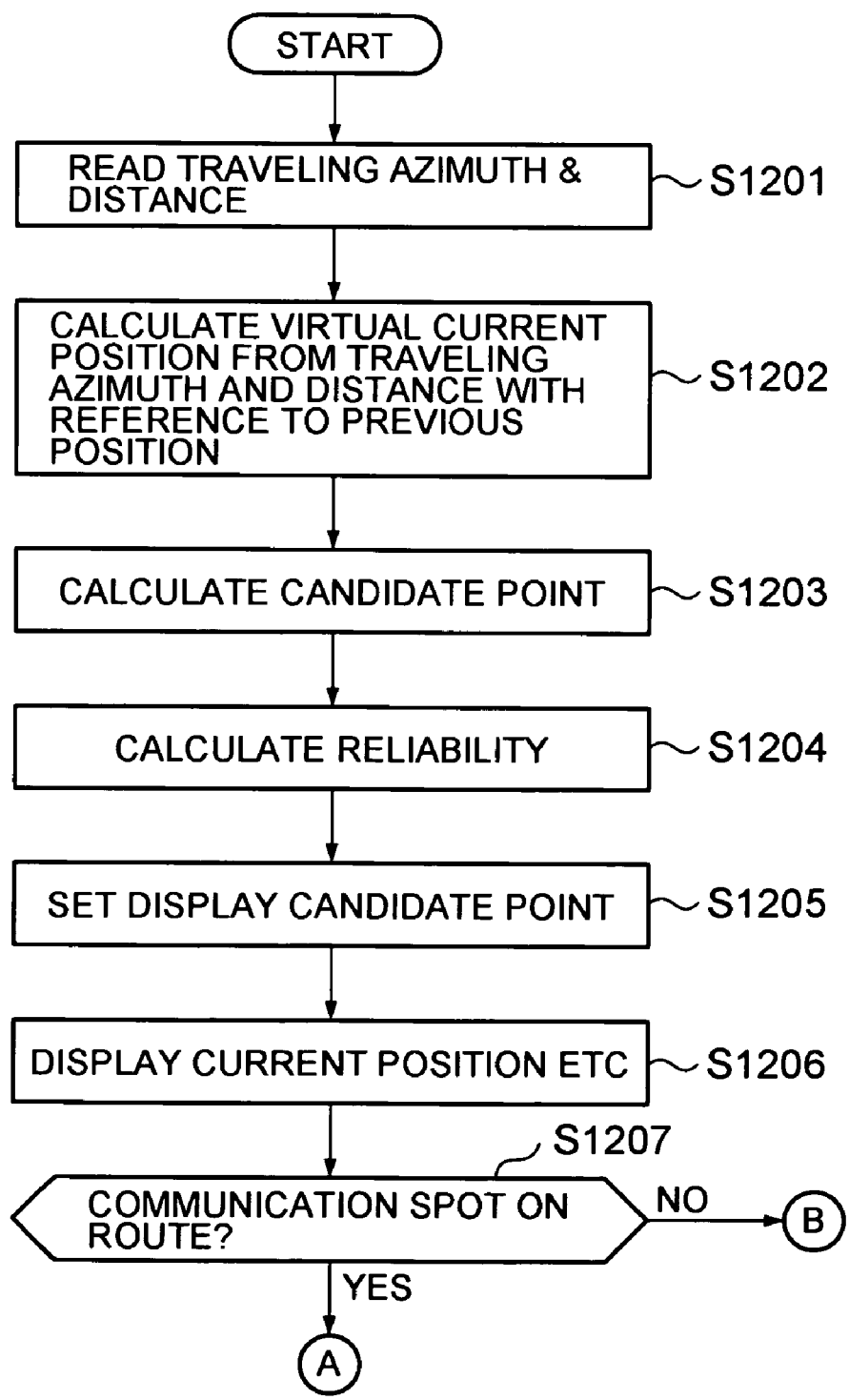
FIG. 12 is an example of operations to calculate the current position in the same embodiment.

Next, an example of the map match operation is described with reference to FIG. 12.

First, the current position calculation unit 243 reads (at S1201) the traveling azimuth and distance and the like from the RAM 224. Next, the current position calculation unit 243 calculates the movements of the vehicle 5 separately in the latitudinal and longitudinal directions on the basis of the traveling azimuth and distance read out. Then, the current position calculation unit 243 calculates (at S1202) the virtual current position or the position where the vehicle is estimated to be at present, by adding the calculated movements in the individual directions to the position of the candidate determined by the previous map match operation.

Next, the current position calculation unit 243 calculates (at S1203) one or more candidate points from the virtual current position calculated and the road data contained in the map data, and calculates (at S1204) the degree of reliability of the individual candidate points.

Described here are the candidate points and their reliabilities. The current position calculation unit 243 reads the map around a virtual current position from the storage device 206, and selects and extracts the road data (or segment) around the virtual current position and within a preset distance D. In this embodiment, the current position calculation unit 243 reads, from the storage device 206, the map contained in the area around the virtual current position and corresponding to a square of length L1.

Next, the current position calculation unit 243 selects from the extracted line segments, only line segments that have azimuths within a predetermined value from the traveling directions acquired by the abovementioned processing, and determines the length of a perpendicular line L(n) from the virtual current position for all the n-segments selected. On the basis of the lengths of these perpendicular lines, the current position calculation unit 243 calculates the error cost value ec(n), as defined by the following formula, for the individual segments selected.

$$ec(n) = \alpha \times |\theta car - \theta(n)| + \beta |L(n)|$$

Here, θcar designates the vehicle azimuth at the virtual current position; θ(n), the azimuth of the segment; L(n), the distance from the virtual current position to the segment, that is, the length of the perpendicular line; and α and β, weight coefficients. The values of these weight coefficients may be varied depending upon which of the deviation between the traveling direction and the azimuth of the road, and the deviation between the current position and the road, that the current position emphasizes in selecting the road on which the current position lays.

Next, the current position calculation unit 243 calculates accumulation error cost es(n) for the processing this time, as defined by the following formula, according to the calculated error cost ec(n) and the accumulated error cost es relating to candidate points calculated in the previous processing.

$$es(n) = (1-k) \times es + k \times ec(n)$$

Here, K designates a weight coefficient larger than 0 and smaller than 1. On the basis of the accumulated error cost es(n) calculated, the current position calculation unit 243 calculates the reliability trst(n) defined by the following formula.

$$trst(n) = 100/(1 + es(n))$$

On the basis of the calculated reliability trst(n), the current position calculation unit 243 sets, as a new candidate point C(n), a point, at which a length corresponding to a distance R that the vehicle has proceeded along a corresponding line segment from a candidate point. Therefore, in cases in which n is the number of line segments, which exist within the predetermined range D from a current position A for a candidate point, and for which the difference between the azimuth and the vehicle azimuth is equal to or less than a predetermined value, n new candidate points C(n) are generated.

The current position calculation unit 243 selects, when it calculates candidate points and their reliabilities, the candidate point having the highest reliability, and sets it (at S1205) as the display candidate point. This display candidate point becomes the information indicating the current position to be displayed in the display 208. The current position calculation unit 243 stores in the RAM 224 the information indicating the position of that display candidate.

Next, the current position calculation unit 243 locates the display candidate points read from the predetermined area of the RAM 224, in the map, and displays (at S1206) the points together with the recommended route calculated by the aforementioned operation, and the communication spots in the display 208.

Here, the current position may be calculated from the traveling azimuth, the distance, the map data and the like acquired by the sensors, as described above, or from the position, the traveling direction, the traveling azimuth and the like received by a GPS receiver device 204. Moreover, the current position, as calculated from the traveling azimuth, the distance and the map data acquired by the sensor, as described above, may be corrected with the position received by the GPS receiver device.

The decision unit 244 decides (at S1207) whether or not the communication spot is on the recommended route. For example, the decision unit 244 reads from the RAM 224 and the like the node of the link composing the recommended route, the communication spot position 411 of the communication spot information table 401, and the communication spot position 511 of the registered communication spot information table 501, and decides whether or not the recommended route passes through any communication spot. For example, the route searching unit 242 stores not only the information on the recommended route but also the information indicating the communication spot to pass through that the recommended route, in a predetermined area of the RAM 224 and the like. The decision unit 244 decides from the fact that the information indicating the communication spot is stored in the predetermined area of the RAM 224, whether or not the recommended route will pass through the communication spot. At the time of the cost calculation and the like, as exemplified in the aforementioned S906, the route searching unit 242 changes the flag indicating whether or not the link composing the recommended route passes through the communication spot, and the decision unit 244 decides with that flag whether or not the recommended route passes through the communication spot.

Figure 13:
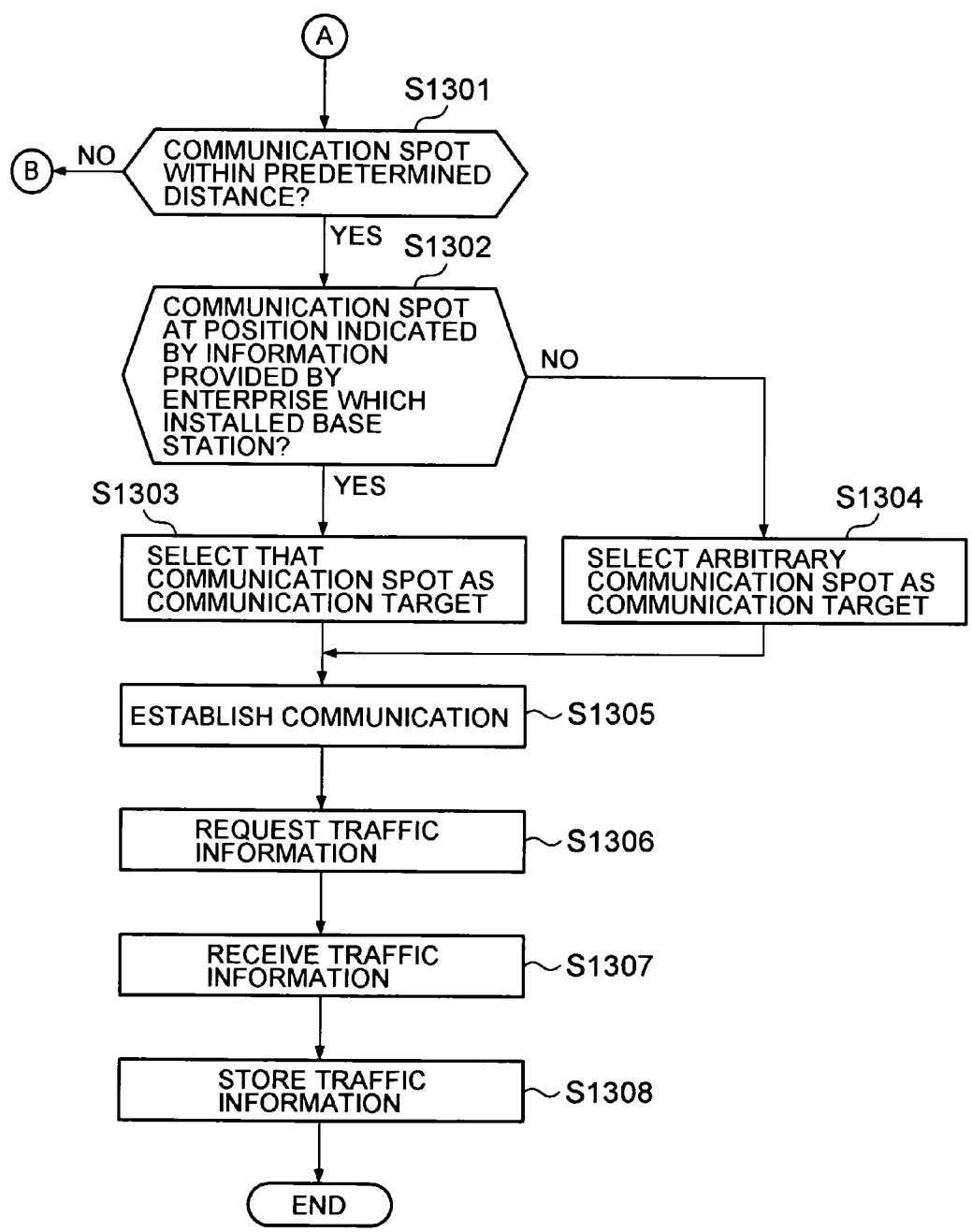
FIG. 13 is an example of a case in which a communication spot is present on a recommended route, in the same embodiment.

First, an example of the operations of cases in which it is decided at S1207 that the communication spot exists on the route, is described with reference to FIG. 13. In FIG. 13, the decision unit 244 decides (at S1301) whether or not the communication spot exists within a predetermined range from the current position. Specifically, for example, the decision unit 244 decides whether or not any of the communication spot positions 411 and the communication spot positions 511, of the communication spot information table 401 and the registered communication spot information table 501 in the storage device 206, is within a predetermined range from the current position read from the RAM 224, on the road having that current position.

In cases in which it is decided at S1301 that no communication spot is within a predetermined range from the current position, the decision unit 244 performs the later-described operation of S1401.

In cases in which it is decided at S1301 that the communication spot is within the predetermined range from the current position, the decision unit 244 decides (at S1302) whether or not the communication spot is a position indicated in the communication spot information provided by an enterprise that installs the base station 3. Specifically, for example, the decision unit 244 decides whether or not the mesh ID and the X-Y coordinates of the communication spot contained in the predetermined range from the current position coincide with those of the communication spot position 411 of the communication spot information table 401. In cases in which a plurality of communication spots are contained within the predetermined range from the current position, the decision unit 244 decides whether or not the mesh ID and the X-Y coordinates of the position of each communication spot coincide with those of the communication spot position 411 of the communication spot information table 401.

In cases in which it is decided at S1302 that the position of the communication spot within the predetermined range from the current position is indicated by the communication spot information provided by the enterprise that installs the base station 3, the decision unit 244 selects (at S1303) the communication spot as the communication target, and instructs the short range communication processing unit 245 to communicate at the selected communication spot. In cases in which there is a plurality of communication spots contained within the predetermined range from the current position and in cases in which one communication spot is indicated by the communication spot information provided by the enterprise that installs the base station 3, the decision unit 244 selects one communication spot as the communication target. In cases in which a plurality of communication spots are at the position indicated by the communication spot information provided by the enterprise that installs the base station 3, the decision unit 244 selects one of the corresponding communication spots according to the predetermined rules or arbitrarily, and instructs the short range communication processing unit 245 to communicate at the selected communication spot.

In cases in which it is decided at S1302 that the position of the communication spot within the predetermined range from the current position is not indicated by the communication spot information provided by the enterprise that installs the base station 3, the decision unit 244 selects (at S1304) one communication spot as the communication target according to the predetermined rules or arbitrarily, and instructs the short range communication processing unit 245 to communicate at the selected communication spot.

The short range communication processing unit 245 establishes (at S1305) communication at the instructed communication spot. This operation is identical to that in the conventional art. Specifically, for example, when a signal sent from the base station 3 of the communication spot instructed is detected, the short range communication processing unit 245 establishes the communication in response to the signal. Next, the short range communication processing unit 245 sends (at S1306) the traffic information demand to the information providing device 1 from the base station 3.

The traffic information transmission processing unit 111 of the information providing device 1 reads, when it receives the traffic information request, the traffic information from the traffic information storage unit 121, and transmits the read information through the base station 3 to the navigation system 4. Specifically, for example, the traffic information transmission processing unit 111 transmits the mesh ID, the link ID of the link configuring the road contained in the mesh indicated by that mesh ID, the travel time, the traveling speed and the acquisition time of each link. This acquisition time is the date/time at which the traveling time, the traveling speed and so on are acquired from the road communication information center or the like.

Here, the traffic information transmission processing unit 111 may transmit all or a portion of the traffic information stored in the traffic information storage unit 121. In cases of transmitting a portion of the traffic information, for example, the traffic information transmission processing unit 111 may transmit either the traffic information, as transmitted from the navigation system 4, within a predetermined range from the current position, or the traffic information, as transmitted from the navigation system 4, within a predetermined range from the recommended route.

The short range communication processing unit 245 of the navigation system 4 stores (at S1308), when it receives (at S1307) the traffic information transmitted from the information providing device 1, the received traffic information in the RAM 224. For example, the short range communication processing unit 245 overwrites and stores the mesh ID transmitted from the information providing device 1, the link ID of the link composing the road contained in the meshes indicated by the mesh ID, and the traveling time, the traveling speed, the acquisition time, and the like, of each link, as the mesh ID 611 of the traffic information table 601, the link ID 612, the traveling time 613, the traveling speed 614, the acquisition time 615 and so on.

After the traffic information has been acquired, as described above, the route searching unit 242 or the like of the navigation system 4 may decide whether or not the route has to be again searched. Examples in which search has to be repeated include cases where a road, on which the current position calculated this time is located, is different from a road on which a current position calculated the previous time is located, and cases where the difference between the cost calculated by the traffic information and the like, stored at the time of the previous route search and the cost calculated by the traffic information and the like, received this time, exceeds a predetermined threshold value.

Next, an operational example is described with reference to FIG. 14, where it is decided at S1207 in FIG. 12 that the communication spot is not on the recommended route.

Figure 14:
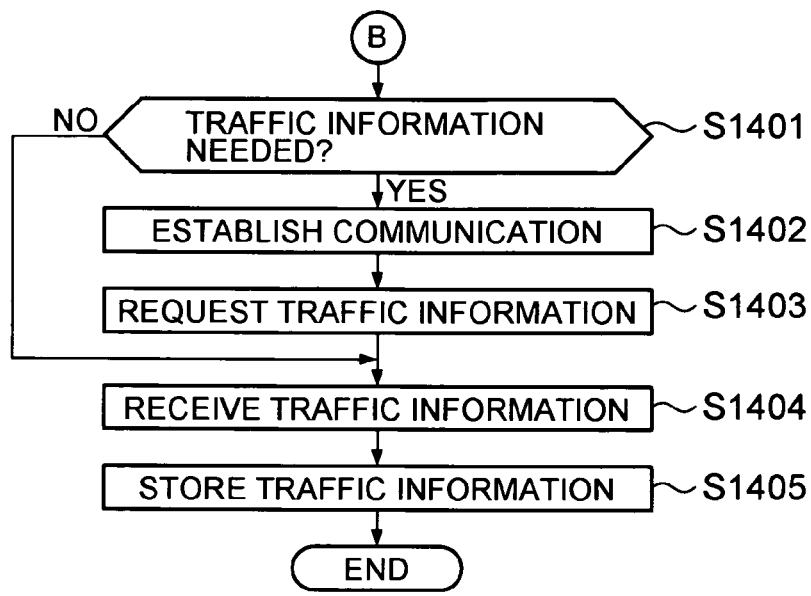
FIG. 14 is an example of operations of a case in which the communication spot is absent from the recommended route, in the same embodiment.

In FIG. 14, the decision unit 244 decides (at S1401) whether the traffic information has to be acquired or not. In order to decide whether the traffic information has to be acquired or not, the decision unit 244 judges whether or not a predetermined time has elapsed or a predetermined distance has been traveled from the acquisition of the previous traffic information. Specifically, for example, the decision unit 244 reads from the RAM 224 the date/time, which is made to correspond to the traffic information acquired the previous time, and decides that the traffic information has to be acquired, in cases in which the difference between the read date/time and the current date/time acquired from an internal clock (not shown) is greater than or equal to a predetermined value. Moreover, for example, the decision unit 244 adds the summations of the travel distances from the previous time of acquisition of the traffic information, and considers it necessary to acquire the traffic information, in cases in which the summation of the travel distance exceeds the predetermined value. It is preferred that this summation of the running distance is reset when the traffic information is acquired. The summation of the running distances may be realized either by the dedicated function, or the summation of the running distances, as acquired by the aforementioned operations, may also be realized by storing it in the RAM 224.

In cases in which it is decided at S1401 that the traffic information need not be acquired, the decision unit 244 ends the operations at this time, but repeats the operations after a travel time of a predetermined distance.

In cases in which it is decided at S1401 that the traffic information has to be acquired, the decision unit 244 instructs the communication terminal communication processing unit 246 to acquire the traffic information. The communication terminal communication processing unit 246 establishes (at S1402) connections with the public network 2 by transmitting the connection request to the carrier server (not shown) by the same operations as those of the conventional art, and is connected with the information providing device 1 through the public network 2.

Next, the communication terminal communication processing unit 246 (at S1403) transmits a traffic information request to the information providing device 1 through the public network 2. The following operations of the communication terminal communication processing unit 246 are simply described because they are the same as the above-mentioned operations.

The traffic information transmission processing unit 111 of the information providing device 1 reads, when it receives the traffic information request, the traffic information from the traffic information storage unit 121, and transmits the read information to the navigation system 4 through the base station 3.

The communication terminal communication processing unit 246 of the navigation system 4 stores (at S1405), when it receives (at S1404) the traffic information transmitted from the information providing device 1, the received traffic information in the RAM 224. As above, the route searching unit 242 or the like, of the navigation system 4 may also decide, after acquiring the traffic information, whether or not the route has to be again searched.

Thus, in cases where the recommended route passes the communication spot or the area which can be connected with the information providing device through the short range base station, the navigation system 4 can be connected through the base station after it reaches the communication spot, but in cases the recommended route does not pass through the communication spot, it can be connected through the public network by using the communication terminal. As a result, irrespective of the existence of the communication spot on the recommended route, connection through the public network is eliminated so that communication charges such as packet charges need not be paid to the communications enterprise. Moreover, the user himself or herself need not change the connection method.

Furthermore, the communication spot indicated in the information provided by the enterprise that installs the base station 3 is preferentially connected, as described at S1302 to S1305, so that the possibility of connection processing according to erroneous information can be reduced. For example, in cases in which user registration has been made in the enterprise that installs the base station 3, as in this embodiment, the connection can be made with the information providing device 1 through the base station 3, in which the user is registered as a member, even in cases in which the use of the base station 3 is free for registered members, although others are charged.

Figure 15:
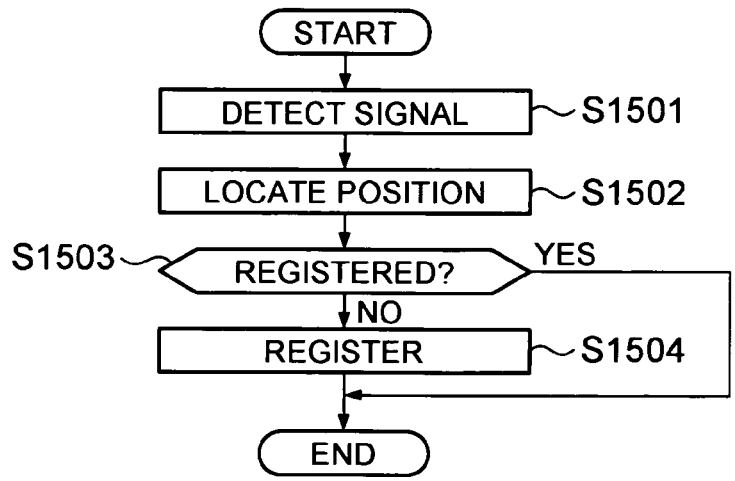
FIG. 15 is an example of operations of a case in which a detected communication spot is registered, in the same embodiment.

Next, an example of the operations for the navigation system 4 to detect a new communication spot and to register the detected communication spot is described with reference to FIG. 15.

The short range communication processing unit 245 of the navigation system 4 starts the detection of a signal from the communication spot. This detection may be started either when the user inputs an instruction to start detection, through the input device 207, or when the vehicle 5 travels a predetermined distance.

The short range communication processing unit 245 locates (at S1502), when it detects (at S1501) the signal sent from the communication spot, the position of the communication spot. For example, the short range communication processing unit 245 decides, when it detects a signal sent from the base station 3, whether or not reception level (or voltage) of that signal is at a predetermined threshold value or higher. In cases in which the reception level of the signal is equal to or higher than the threshold value, the short range communication processing unit 245 stores in the RAM 224 the mesh ID and the X-Y coordinates of the current position at that position and the reception level of the signal from the base station 3 at that position in a corresponding manner. The short range communication processing unit 245 reads the reception level of the signal from the base station 3, from the RAM 224, when the reception level of the signal, for the first time after equaling or exceeding the threshold value, becomes lower than the threshold value, and decides that the mesh ID and the X-Y coordinates of the position having the highest reception level read are located at the position of the communication spot.

Next, the short range communication processing unit 245 decides (at S1503) whether or not the detected communication spot has been registered. For example, the short range communication processing unit 245 decides whether or not the mesh ID and the X-Y coordinates of the position of the communication spot specified by the operation of S1502 are contained within a predetermined range from the individual mesh IDs and the X-Y coordinates of the communication spot position 411 of the communication spot information table 401. Moreover, the short range communication processing unit 245 decides whether or not the same are contained within a predetermined range from the individual mesh IDs and the X-Y coordinates of the communication spot position 511 of the registered communication spot information table 501. In cases where the detected communication spot is not contained in both the communication spot position 411 of the communication spot information table 401 and the communication spot position 511 of the registered communication spot information table 501, the short range communication processing unit 245 decides that the communication spot is not registered.

In cases in which it is decided at S1503 that the detected communication spot has been registered, the short range communication processing unit 245 ends the operations.

In cases in which it is decided at S1503 that the detected communication spot is not registered, the short range communication processing unit 245 registers (at S1504) the communication spot. Specifically, for example, the short range communication processing unit 245 adds the mesh ID of the position of the communication spot specified by the operation of S1502 and the X-Y coordinates, and the present date/time acquired from the internal clock, as the communication spot position 511 and the update date/time 512 and the like of the registered communication spot information table 501. Moreover, the short range communication processing unit 245 stores the registered flag 514 corresponding to the added communication spot position 511 or the like, with the information ("1" in the example of FIG. 5) indicating the newly detected communication spot.

Thus, the communication spot detected during travel is additionally registered so that the positional information of the new communication spot can be temporarily acquired.

Figure 16:
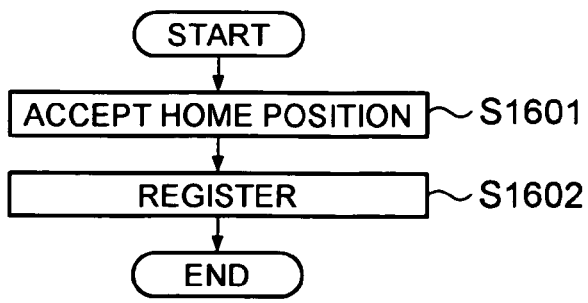
FIG. 16 is an example of operations of a case in which a home wireless LAN is registered as a communication spot, in the same embodiment.

Next, an operational example is described with reference to FIG. 16, in which the navigation system 4 registers, as the communication spot, a home wireless LAN base station designated by the user.

The communication spot registration unit 247 accepts (at S1601) the home position inputted by the user with the input device 207.

Figure 17:
FIG. 17 is an example of a screen for registering the communication spot in the same embodiment.

For this purpose, for example, the communication spot registration unit 247 displays a screen 1701, as exemplified in FIG. 17, in the display 208. In FIG. 17, the screen 1701 presents an example in which either the home position is acquired from the mesh ID and the X-Y coordinates of the home indicated by the user with the input device 207, or from the mesh ID, the X-Y coordinates and the like of the home read from the storage device 206, the RAM 224 and the like and registered in advance, and in which the image data and the like of the map containing the acquired home position and the home position read from the storage device 206 is synthesized and displayed in the display 208.

Next, the communication spot registration unit 247 registers (at S1602) the received position as the communication spot. For example, the communication spot registration unit 247 adds the mesh ID and the X-Y coordinates of the home, and the current date/time as the communication spot position 511, the update date/time 512, and the like, of the registered communication spot information table 501. The communication spot registration unit 247 stores the information ("1" in the example of FIG. 5) indicating the newly detected communication spot, in the home flag 513 corresponding to the added communication spot position 511 and the like.

Thus, the traffic information can be acquired in the home garage and the like by registering the home wireless LAN base station in the communication spot. In cases in which the current position is located, with the communication spot registration unit 247, at the position set as the home in the aforementioned route searching operation, the traffic information may be acquired from the information providing device 1 through the home wireless LAN base station, and the route searching operation may be performed after that information is acquired.

The operations have been described for cases in which the home wireless LAN base station is registered as the communication spot. However, the communication spot to be registered should not be limited to only the home wireless LAN base station, but can register an arbitrary communication spot designated by the user by the same operations as described above.

Figure 18:
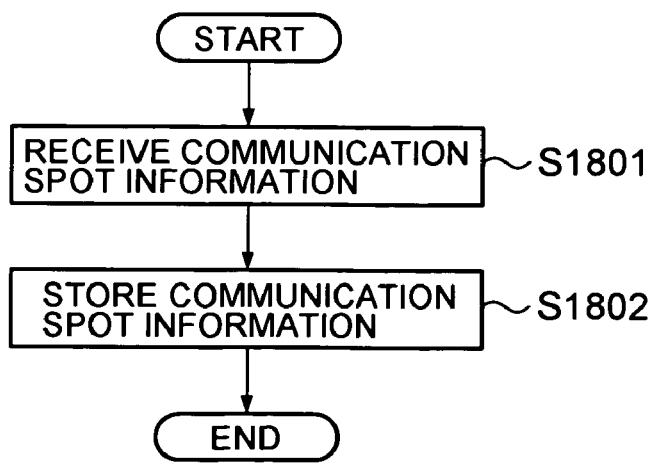
FIG. 18 is an example of operations of a case in which the communication spot transmitted from the information providing device is registered, in the same embodiment.

Next, an operational example is described with reference to FIG. 18, in which the navigation system 4 registers the communication spot information transmitted from the information providing device 1.

The communication spot information transmission processing unit 112 of the information providing device 1 transmits the communication spot information read from the communication spot information storage unit 122, to the navigation system 4. Specifically, the communication spot information transmission processing unit 112 transmits the mesh ID, the X-Y coordinates, and the like, indicating the communication spot position, to the navigation system 4. The timing is not especially limitative. In cases in which the home wireless LAN is registered as the communication spot, for example, the communication spot information acquisition unit 248 of the navigation system 4 may transmit the communication spot information request so that the information providing device 1 may transmit that request, when the vehicle 5 is stopped in the home parking area or when a predetermined time elapses from the previous update date/time. When the vehicle 5 is brought for inspection to the dealer who sold it, moreover, the communication spot information acquisition unit 248 of the navigation system 4 may also transmit the communication spot information request through the base station 3 disposed at the location of the dealer.

The communication spot information acquisition unit 248 of the navigation system 4 registers (at S1802) the information, when it receives (at S1801) the communication spot information transmitted from the information providing device 1. Specifically, for example, the communication spot information acquisition 248 adds the mesh ID and the X-Y coordinates indicating the communication spot position as the communication spot position 411 and the like of the communication spot information table 401. Moreover, the communication spot information acquisition unit 248 stores the date/time at which the information is acquired by the internal clock (not shown), in the update date/time 512 corresponding to the added communication spot position 411 and the like.

Although the embodiment of the invention has been described in detail with reference to the drawings, the specific configuration is not limited to that embodiment but cover design changes within a scope not departing from the gist of the invention.

Figure 19:
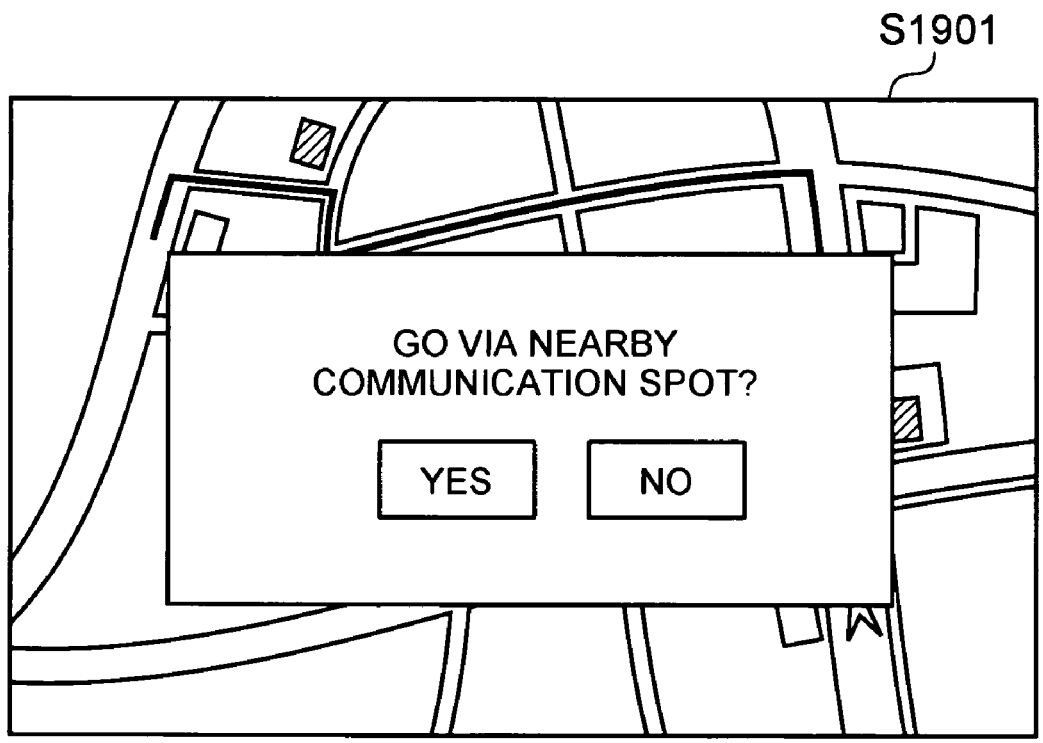
FIG. 19 is an example of a screen for indicating whether or not the communication spot is to be passed through, in the same embodiment.

In the embodiment thus far described, for example, the traffic information is acquired by using the communication spot, if there is one on the recommended route, and by using a mobile terminal in cases where the communication spot is not on the recommended route. However, the invention is not limited thereto. In cases where the communication spot is not on the recommended route, or in cases where the communication spot is not passed in a predetermined distance, or in cases where the communication spot is not passed in a predetermined time but is within a predetermined range from the recommended route, a screen 1901, as exemplified in FIG. 19, may be displayed on the display 208 to urge a decision on whether or not the communication spot is to be passed. In cases where the user instructs passage through the communication spot by using the input device 207, the navigation system 4 may perform the aforementioned searching operation, with that communication spot as a place to be passed through, searching the route again and displaying it as before.

Moreover, the aforementioned navigation system 4 acquires the traffic information from the information providing device, but the information acquired should not be limited thereto, as described above. For example, contents such as music data or image data may be acquired from the information providing device. In this case, the received contents may be divided according to the number of communication spots to be passed. For this purpose, for example, the navigation system 4 transmits, in cases where the recommended route passes through the communication spot, as described above, the information and the like indicating the number of communication spots to be passed and the contents to be received, to the information providing device. The information providing device may divide the contents data indicated by the received information, according to the number of received communication spots, may transmit the contents request to the information providing device every time the navigation system 4 passes through the various communication spots, and may transmit the divided contents data.

In the aforementioned embodiment, the position on the map data is indicated by the mesh ID and the X-Y coordinates, but it is not limited thereto. The position may be indicated exclusively by latitude and longitude or exclusively by the X-Y coordinates. Moreover, the latitude and longitude, the X-Y coordinates, and the like, may be combined with other information.

What is claimed is:

1. A navigation system connected with an information providing device via, respectively, a public network and a base station for short range communication, for receiving information transmitted from said information providing device, said navigation system comprising:

map information storage means which stores information indicating a position of said base station and map data containing road data;

route storage means which stores a route composed of at least one road;

current position calculating means which calculates current position;

first communication means connected with said base station;

second communication means connected with the public network; and decision means which decides whether or not the route read from the route storing means passes through an area in which communication is possible by the base station read from said map information storage means, wherein, in cases in which it is decided that said route passes through the area in which communication by said base station is possible, said navigation system is connected with said base station using said first communication means after said area is reached, and in cases in which it is decided that said route does not pass through the area in which communication by said base station is possible, said navigation system is connected with said public network using said second communication means.

2. A navigation system according to claim 1, wherein, in cases in which a road constituting said read route is within a predetermined range of the base station read from said map information storage means, said decision means decides that the area in which communication with said base station is possible, is to be passed through.

3. A navigation system according to claim 1, further comprising:

reception means which receives the information transmitted from said information providing device and indicating the position of said base station; and registration means for storing said received information indicating the position of said base station, in said map information storage means.

4. A navigation system according to claim 1, further comprising:

position specifying means which, when said first communication means receives a signal outputted from said short range communication base station, specifies the position of said short range communication base station from reception level of the signal received from said short range communication base station by said first communication means; and additional registration means which stores the information indicating the received position of the base station, in said map information storage means.

5. An information acquisition method using a navigation system connected with an information providing device via, respectively, a public network and a base station for short range communication, for receiving information transmitted from said information providing device, wherein said navigation system comprises:

map information storage means which stores information indicating a position of said base station and map data containing road data;

route storage means which stores a route composed of at least one road;

first communication means connected with said base station;

second communication means connected with the public network; and wherein the method comprises the steps of:

calculating a current position;

deciding whether or not the route read from the route storing means passes through an area in which communication is possible by the base station read from said map information storage means; and connecting said navigation system, in cases in which it is decided that said route passes through the area in which communication by said base station is possible, with said base station, using said first communication means after said area is reached, and in cases in which it is decided that said route does not pass through the area in which communication by said base station is possible, with said public network using said second communication means.

* * * * *